Figure 1:
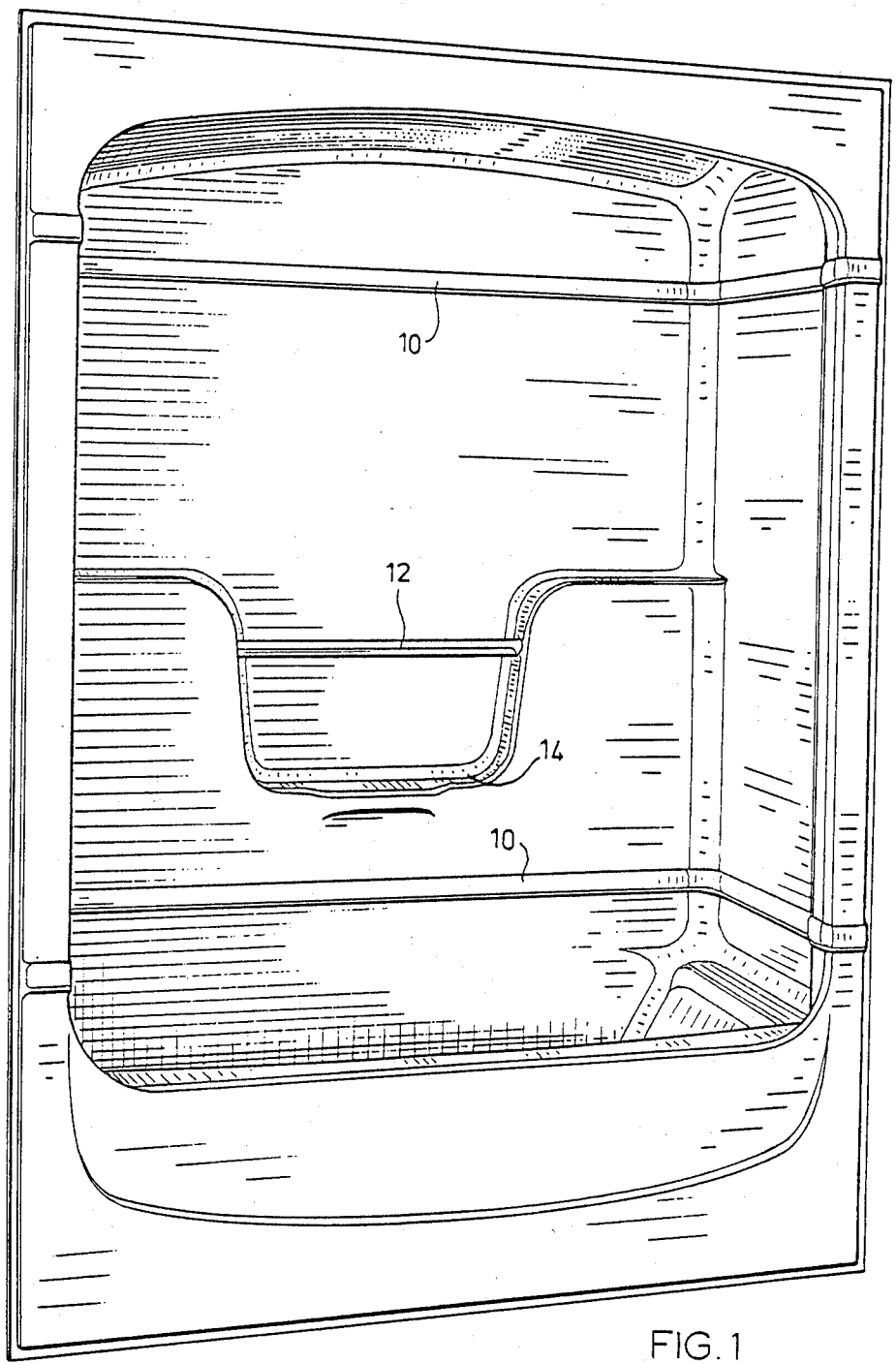

United States Patent [19]

Primucci

[11] Patent Number: 4,578,832

[45] Date of Patent: Apr. 1, 1986

[54] PLASTIC SHOWER ENCLOSURE

[75] Inventor: Joseph Primucci, Willowdale, Canada

[73] Assignee: Mirolin Industries Inc., Toronto, Canada

[21] Appl. No.: 516,711

[22] Filed: Jul. 25, 1983

[51] Int. Cl.$^4$ ................................................ A47K 3/23
[52] U.S. Cl. .......................................... 4/614; 4/584; 403/337; 52/35
[58] Field of Search .................... 4/584, 612–614, 4/449, 462, 596, 599, 600; 52/34, 35, 79.1, 79.5, 79.9, 79.13, 264, 266; 403/335–337

[56] References Cited

U.S. PATENT DOCUMENTS

| | | | |
|---|---|---|---|
| 1,366,955 | 2/1921 | Schneible | 403/337 X |
| 3,149,187 | 9/1964 | Wood | 52/79.1 X |
| 3,479,778 | 11/1969 | Johnson | 52/35 |
| 3,835,480 | 9/1974 | Harding | 52/79.1 X |
| 3,858,987 | 1/1975 | Kleinhans et al. | 403/336 X |
| 4,080,710 | 3/1978 | Hess | 52/264 |
| 4,109,426 | 8/1978 | Dobija | 52/35 |
| 4,365,368 | 12/1982 | Boggs | 4/614 X |
| 4,471,501 | 9/1984 | Heymann | 4/613 X |

FOREIGN PATENT DOCUMENTS 647474 8/1977 U.S.S.R. ............................ 403/337

*Primary Examiner*—Charles E. Phillips

[57] ABSTRACT

A shower stall is vacuum formed with excess height and with two horizontal raised bands. Horizontal cuts are made at the lower boundary of the bands and the cut sections are treated so that each lower section may be overlapped behind the band location of the upper section in the reassembled stall. When other techniques than vacuum forming are used, the sections similar in shape to the cut and and treated sections above may be separately made for reassembly in the same manner.

8 Claims, 10 Drawing Figures

PLASTIC SHOWER ENCLOSURE

This invention relates to a plastic shower enclosure and its means for construction.

By "shower enclosure" I include such enclosures which are shaped to provide bathtub at the bottom and those which are shaped to provide a shower only.

The invention extends to providing an inventive shower enclosure which may be constructed by vacuum forming techniques or from plastic formed in other ways such as by conventional methods using glass fibre and resin. The invention also extends to an inventive method of forming the inventive enclosure when using vacuum forming techniques.

So far as concerns the aspect of the invention which relates to vacuum forming techniques and vacuum formed products, it is noted that although the apparatus and method are suitable for use with other vacuum formable plastics than acrylic, and hence the invention extends to such other vacuum formable plastics. However, acrylic is expected to be by far the most common in view of its attractive finish.

By the terms 'inward' and 'outward' herein I mean directions toward the exposed and toward the non-exposed sides, respectively, of the enclosure.

In producing a plastic shower enclosure which includes top, side, rear walls, and the bottom wall or bath contour and usually includes surrounding facing walls on at least the top and sides, it would, in some respects be most efficient and economical of material to vacuum form or otherwise form the entire enclosure as one unit in a single operation. There would then be formed a unit which has the width, height and depth of a shower stall with or without a bath. (By depth we refer to the horizontal distance from front to rear of the fixture). Such unit, once formed would frequently be too large to be passed through the doorways and passages of many houses. Thus, if vacuum forming techniques are used, to form such the enclosure as a single unit, such unit if too large for taking into a house, must be cut into sections to be installed. Such sections are normally formed by one or two horizontal cuts. When such sections are reassembled in the bath or shower room, a seal has been installed along the cut sections to prevent leakage therebetween. Such seal has customarily involved a gasket between and about the joint usually covered by a facing strip. Such arrangement is often unsightly either because of the appearance of the gasket or strip or because the material of the facing strip although matched in colour never completely matches the appearance of the acrylic. Moreover the formation of the joint necessarily leaves sealing joints facing upwardly or horizontally, or both, which joints are likely to develop leaks in constant use.

Accordingly, it is an object of this invention to provide a shower stall of vacuum formed plastic which is vacuum formed in a single operation but which is horizontally cut into sections for bringing into a dwelling but which, when assembled, does not have joints allowing downward or horizontal passage of water into the joint, and which presents an appearance which is consistent, in that all visible surfaces are of the original plastic.

It is an object of the invention to provide a method of constructing shower stalls which provides a vacuum forming mold of the desired width and depth but which is of greater height than required. The increased height is preferably provided in one or more relatively plain vertical extents of the vacuum formed shape. In such vertical extent, and corresponding to the joints to be formed in the final product, bands or wide flat ridges raised toward the inward side of the shower stall, are made, extending preferably horizontally, and in any event with a horzontal component. In the process of vacuum forming the stall, such raised bands are made by a correspondly raised portion of the mold and provide a corresponding depression on the non-exposed side of the product. The molded product is removed from the mold and preferably strengthened on the non exposed face with a fibreglass layer and cut adjacent the lower boundary of the band, i.e. so that the stall just below the cut is vertical to its edge, while substantially all of the raised band is in the portion of the stall just above the cut. The raised band is then recessed, to the extent necessary on the outward side to allow insertion therebehind of a strip of the top of the lower stall portion with a predetermined amount of overlap, and with the vertical extent of the upper stall section, just above the band, approximately co-planar with the adjacent vertical extent of the lower section. If desired some of the exposed face of the lower section may be removed also to achieve such overlap and co-planarity, as long as the removed portion is hidden by the overlap. However, removing material from both lower and upper member is inconvenient and it is preferable to remove material from the upper section only. With the members shaped to provide such overlap, means are provided for rigidly connecting such overlapping members. In the preferred form such rigidly connecting means comprises clamping members provided for cooperation between the upper and lower sections designed to draw the sections into the described overlapping relation. Preferably, the clamping is combined with a wedging action provided by the clamping means to force the overlapping upper section toward the overlapping lower portion as the clamping proceeds. Although it would be possible to make the displacement of the material at the raised band larger than the thickness of the reinforced lower portion and thus simplify or eliminate the removal of material from the unexposed face of the upper portion, such large arrangement of the stripped band tends to leave a step at the joint of the thickness of the vacuum formed material. A more pleasing appearance is provided if the band is raised by about the thickness of the acrylic sheet and material is removed from the unexposed side of the upper portion sufficient to allow reception of the lower portion in overlaped and co-planar relationship with the vertical extent of the upper stall section. It will be noted that, because of the preferred limit on the displacement of the band, that the lower edge of the upper portion which overlaps tends to be of the tapering appearance towards its lower edge and provides a joint of pleasant appearance with the band appearing almost symmetrical about a median line therealong.

If the shower stall is not constructed by vacuum forming techniques but by some other conventional technique (e.g. that used when making structures from glass fibre and resin) then the stall will probably not be formed originally as an integral unit. If the stall is originally formed as an integral unit then it would be formed with the extra height, and the raised bands and cut horizontally at the lower band boundary all in accord with the procedure previously described for vacuum formed plastics.

However, in most cases, with a conventional non vacuum forming technique (such as that using glass fibre and resin) then the sections; similarly shaped to those cut from the vacuum formed sheet, will be usually separately made. However such separately made sections of solid plastic material will have the same shape as the cut vacuum formed sections and will be joined to form the assembled shower unit in the same way as that heretofore and hereafter described for the cut vacuum formed sections. Thus the invention extends to cover shower stall units from sections which have been separately made and comprise solid plastic material.

It is an object of the invention, to provide a shower stall made of sections of solid plastic material, overlapped over a vertical extent along a line with a horizontal component where at each joint a strip of the upper section overlaps a strip of the lower section and there are vertical extents of said upper and lower sections above and below such joints which are approximately co-planar.

It is an object of the invention to provide a shower stall made of sections of solid plastic material joined along a line with a horizontal component where, at each joint, a strip of the upper section overlaps a strip of the lower section and there are above and below said joint vertical extents of said upper and lower sections which are approximately co-planar, and where means are provided for connecting said overlapping members, and preferably where the connecting member acts to bias said overlapping members toward one another.

Figure 6:
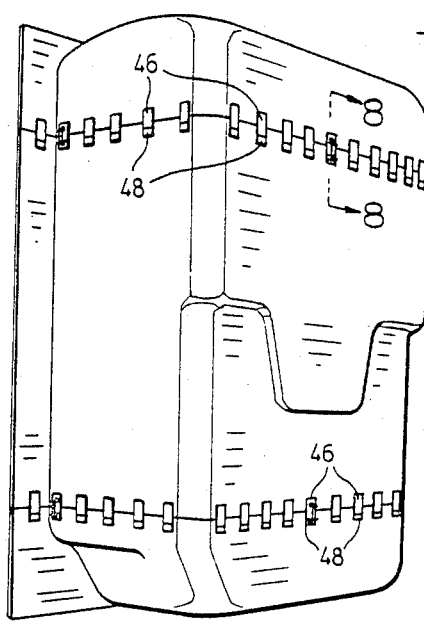
Figure 8:
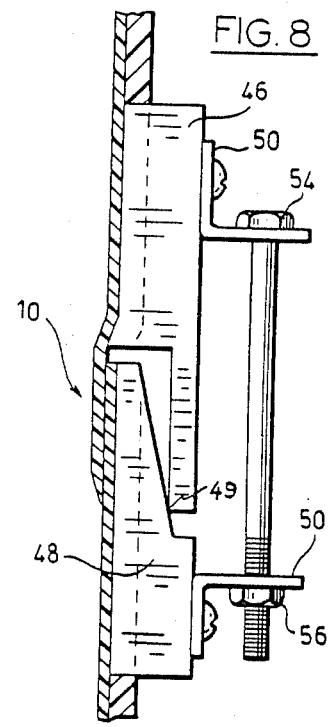
Figure 7:
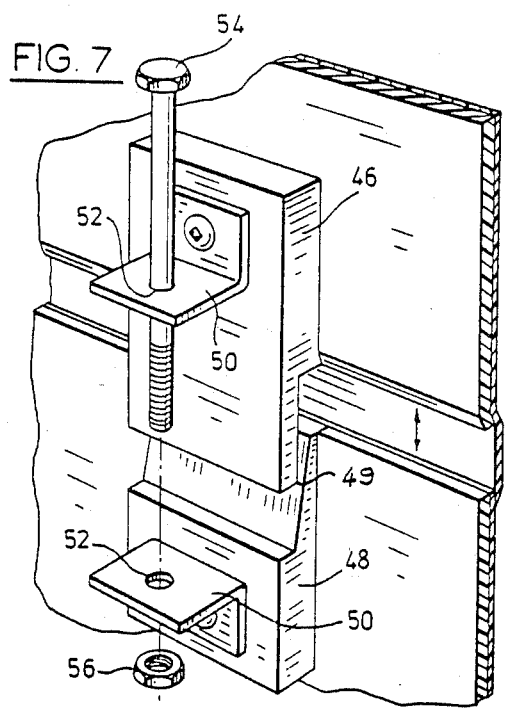
Figures 2A, 2B, 2C:
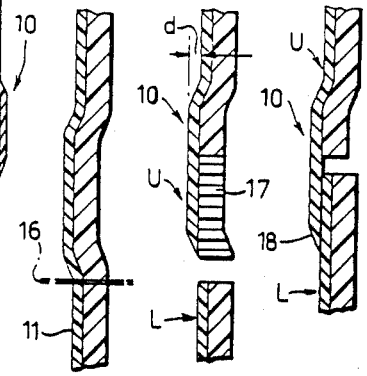
Figure 3:
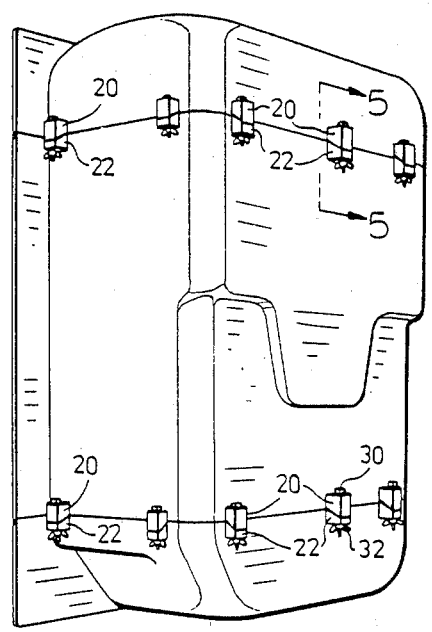
Figure 5:
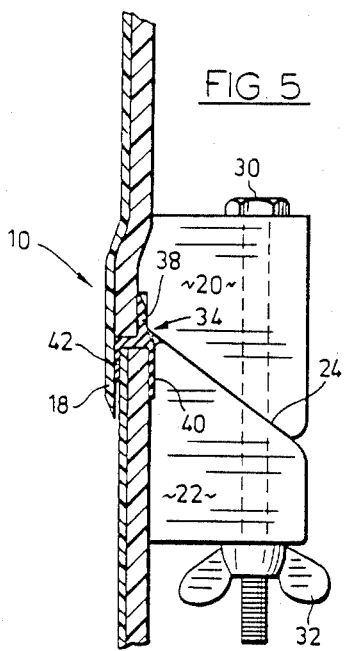
Figure 4:
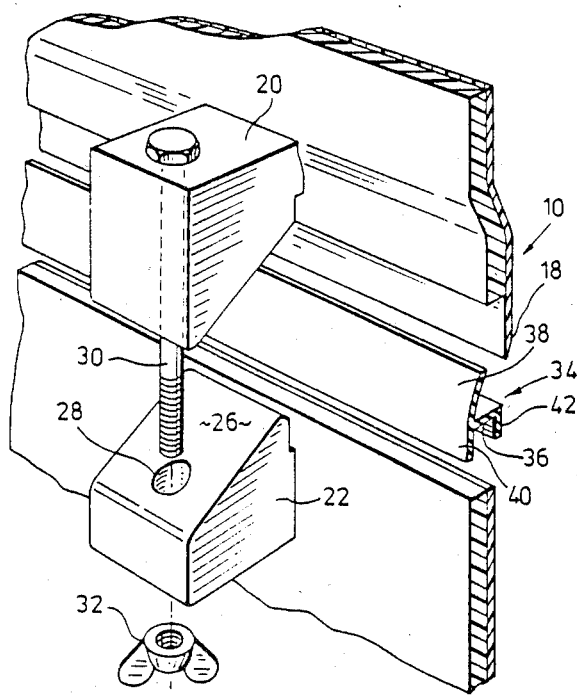

In drawings which illustrate a preferred embodiment of the invention:

FIG. 1 is a perspective view of the exposed or outward side of a vacuum formed shower stall unit before cutting, FIG. 2A, 2B, 2C are sectional views showing the mode of providing the overlap of upper and lower sections, FIG. 3 is a rear view of an assembled stall unit using one design of clamping means, FIG. 4 is a perspective view and FIG. 5 is a partly sectional view of the clamping means of FIG. 3 along the lines 5—5 of FIG. 3, FIG. 6 is a rear view of an assembled stall unit using an alternative design of clamping means, FIG. 7 is a perspective view and FIG. 8 is a side view of the clamping means of FIG. 6 along the lines 8—8 of FIG. 6.

To assist in the brevity of the description it will be easier to first describe the invention with sole reference to the method using vacuum formed plastic material and later to describe that aspect of the invention using plastic material otherwise formed.

It will perhaps be easier to describe the completed assembly of a shower stall enclosure after following the method of construction. Accordingly, FIG. 1 shows the side of a shower enclosure molding blank which will be exposed in normal use, which has just been formed from an initially uniform thickness acrylic sheet on a vacuum forming mold. The molding differs from prior moldings in two ways. Firstly, although the width is that desired for the finished assembly, the height is greater than that desired in the finished assembly by approximately the amount of joint overlap in the assembled product to be described hereafter. Secondly, a raised band 10 extends substantially horizontally across the mold in what, except for the band, would be uninterrupted vertical extents of the molding both above and below the bar 12 and shelf 14. The position of the bands 10 will correspond to the desired positions for joints between the sections. As will be obvious from the discussions to follow that the invention does not require the provision of more than one such band and joint. However, the provision of two provides sections of smaller dimensions for more easy access to the doors and passages of a house and also the provision of two joints instead of one is thought to provide a more balanced and pleasing appearance. It is also noted that it is within the scope of the invention to provide that the bands and joints may be sloping rather than horizontal as long as they have a larger horizontal than vertical component. However, structurally and ornamentalably the use of horizontal bands and joints is preferred, and horizontal joints best utilize the advantages of the invention.

The bands 10 are shaped by correspondingly inwardly raised portion on the vacuum forming mold (not shown). Each band 10 preferably comprises a central extent 12, straight in vertical section displaced from the co-planar extents above and below with the straight extent curving into the co-planar extents. FIG. 2A is a cross section of the band in the original blank. The displacement of the band will be found to contribute to the non-leakage qualities of the device, the shape and curvature contributes chiefly to the appearance. The displacement of the band 10 from the vertical extent (dimension 'd' in FIG. 2A) is preferably equal to the thickness of the adjacent vacuum formed sheet before reinforcement with fibreglass and resin.

The vacuum formed molding 11 is next reinforced on the back by fibreglass and resin 14 to the extent required to provide the necessary structural qualities.

When the resin has dried, the vacuum formed molding is cut adjacent the bottom boundary of each band. For best final appearance the cut 16 is located on the straight extent of the blank just at the point where it begins to curve into the band 10.

As indicated in FIG. 1, two such bands are preferably provided in a blank and a cut at the location relative to the band indicated in FIG. 2A is made horizontally across the blank just below each band.

As indicated in FIG. 2B, after the cut, fibreglass and if necessary some of the acrylic is removed from the outward side of the upper section just above the cut. The material 17 to be removed (by grinding, routing or the like) is indicated by the horizontally shaded portion in FIG. 2B. The recess is shaped so that in the overlapped position with the overlapping members pressed against each other (indicated by dotted lines in FIG. 2C) the vertical extents of the upper section above and of the lower section below the bands are approximately co-planar. By the term "approximately" I take into account that, in most installations for such shower stalls it is not necessary for any structural or installation purpose that such vertical extents be exactly co-planar. It is only necessary that they approach such relationship sufficiently that they appear co-planar to the user of the shower.

Although the blank and assembled shower stall shown herein include a bathtub it will be realized that the invention applies equally to a shower stall without bathtub.

In the overlapped attitude of FIG. 2C it will be seen that the displacement of the band 10 inward relative to the vertical extent by approximately the thickness of the acrylic sheet contributes to the appearance of the finished joint. Thus, when the upper section is received for the overlap, there remains at the exposed side adjacent the edge a thin lip 18 curving on its exposed surface from the flat extent of band 10 toward the flat vertical extent of the shower section and providing an appearance closely approaching symmetry about the median horizontal line of the band.

To attach together the upper and lower sections at a joint, each of the upper and lower sections is provided with clamping means. The preferred embodiment of FIGS. 3-5 uses aligned pairs of upper wooden blocks 20 and lower wooden blocks 22 attached, preferably by fibreglass and resin to the upper and lower section respectively, adjacent the line of the joint as it appears on the non-exposed side. As FIG. 3 shows, pairs of such blocks 20 and 22 are provided spaced along the joint line. The lower face 24 of the upper block 20 is chamferred to slope downwardly and away from the section at about 45°. The upper face 26 of lower block 22 has a complementary chamfer. The blocks are arranged so that their chamferred faces make contact as the desired amount of overlap between the sections is almost reached. To draw the blocks and their attached sections together, aligned vertically directed bores 24 are made in the paired blocks. A bolt 30 is inserted through the aligned bores so that wing nut 32 may be tightened thereon. The aligned bores 28 are made with sufficient clearance for the bolt to allow sideways movement of blocks 20 and 22 relative to each other under the wedging action. When the wing nuts 32 are tightened, the wedging action draws the upper section downwardly and outwardly relative to the lower section, the rearward movement ensuring that the overlapping portions are brought into close proximity to each other and, given the curved form of the upper section lip 18, the clamped overlap produces a pleasant appearance of symmetry in which the exposed joint line behind lip 18 is virtually insignificant. Further because of the overlap of the upper lip 18, the only leakage channel at the joint is upward from the exposed joint line, substantially eliminating the possibility of leakage. It will further be noted that the joint with the clamping members produces an assembled shower stall of sufficient rigidity for installation and use.

There are two joints in the preferred shower stall assembly and only one has been described. However, it will be understood that the construction of the second joint is identical, that at each joint there will be provided the members shown in FIGS. 2C and 3-5 and that the terms upper section and lower section as used above will be used relative to the joint being discussed and that the clamping members will be provided and will operate.

It will further be noted that the amount of the excess height of the vacuum formed blank of FIG. 1 over the designed height of the assembly will correspond to the extent of the two overlaps plus the width of the two saw cuts.

Although it is not thought necessary in most instances, a gasket 34, preferably of rubber, may be provided for each joint. The gasket has a horizontal web 36 to extend between the horizontally abutting section surfaces at the joint. Rearwardly of web 36, flanges 38 and 40 are provided to extend upwardly and downwardly along the rear surfaces of the upper and lower sections respectively. At the forward end of web 36 a downwardly extending lip 42 is provided to be received between the faces of the sections along the upper portion of the overlapping extent. As FIG. 5 shows the blocks 20 and 22 (or the adjacent section surfaces) are recessed to receive the flanges 38 and 40. As FIG. 4 shows flange 38 is initially preferably curved inwardly in cross-section to assist is to be resiliently retained in position when applied.

FIGS. 6-8 show a joint clamping means as an alternative to that shown in FIGS. 3-5. As before, although there are two joints, these will be identical and only one will be described. At each joint the blank will have been cut and recessed as schematically shown in FIGS. 2A, 2B, 2C. However, as FIG. 8 shows the amount of material removed from the reccess is greater from the embodiment of FIGS. 6-8 than required for the embodiment of FIGS. 3-5 and greater than the amount 17 shown in FIGS. 2B, 2C. This is because of the greater overlap of the embodiment of FIGS. 6-8.

FIGS. 7 and 8 show narrow wooden blocks 46 and 48 which are fibreglassed onto the rear of the upper and lower sections. Block 48 has a downwardly-outwardly sloping chamferred face facing rearwardly as shown. Block 46 defines (with band 10) a recess wide enough to receive only part of the maximum thickness of block 48. An outwardly extending bracket 50 is screwed to each block and the brackets have aligned apertures 52. The bolt 54 extending through the aligned apertures 50 allows nut 52 to be tightened to draw the brackets and blocks toward one another and the chamferred face of block 48 bears on the adjacent lower corner 49 of block 46 (as shown in FIG. 8) to move the overlapping section members into pressure contact with one another. Because the chamfer of block 48 is more nearly vertical than that of blocks 20 and 22 in FIGS. 3-5, the clearance for bolt 54 in apertures 52 may be less. Provision for a gasket with the embodiment of FIGS. 6-8 is not shown but may be made if desired. The appearance of the exposed surface of the shower stall is similar, for both embodiments. The embodiment of FIGS. 6-8 has an advantage in that the rearward projection of the clamping members is less than with the clamping members of FIGS. 3-5.

It is easiest to describe the correct location of the cut 16 with reference to FIGS. 2A, 2B, 2C. The cut should be made at the meeting of the lower curve of a band and the straight extent therebelow. This gives the best symmetry (across the median horizontal line of the band) of appearance in the finished joint as suggested in FIG. 2C. If the cut 16 is located higher than shown in FIG. 2A so that, it is fully into the curved lower part of the band or even into the straight portion of the band then there will be formed a definite step above the cut which will be visible and less slightly in the final joint. Also any portion of the band left below the cut will have to be removed to form the joint. If the cut 16 is located in the straight portion below the band any straight portion above the cut and below the band will simply have to be removed during the process of forming the recess behind the band to receive the (outwardly) overlapping lower section.

If vacuum forming techniques are not used but the unit of FIG. 1 is made from plastic by other methods then the cutting and construction is as described above for vacuum formed plastics.

Turning to the formation of a shower stall with separate original sections this may be performed with any conventional technique for forming the section shapes from solid plastic. Most commonly this such section will be formed by conventional techniques for glass fibre and resin. In accord with this the sections as shown in FIGS. 3-8 will be each separately formed.

They will normally have a single fibreglass layer rather than the laminated acryllic and fibreglass shown. The bands, lip 18 and the recess behind lip 18 for receiving the lower section will be formed either during the original fibreglass forming or partly at that time and partly thereafter by routing or other removal of excess material to form both the recess, the lip and the shaping of the parts. The shaping of the coupling parts of the separate sections may, of course be that of FIG. 2C or FIG. 5. The same attachment means for clamping and wedging will be attached to the separately formed sections and may take the form shown in FIGS. 3-5, or that shown in FIGS. 6-8 or a similar clamping means. A gasket such as that shown in FIGS. 4 and 5 may be used or not as desired.

I claim:

1. Shower enclosure comprising an assembly defining rear and side shower walls,
    and being divided into upper and lower sections,
    a junction between said upper and lower sections,
    said upper and lower sections each defining vertical wall extents adjacent said junction, said wall extents having interior and exterior sides,
    said junction including a band of material defining a lip, adjacent the lower edge of the upper section and displaced inwardly relative to the shower enclosure from the upper section vertical extent,
    the upper section being recessed on said exterior side of said band to define said lip and, to receive an upper extent of said lower section on said exterior side with said upper and lower sections vertical extents being approximately co-planar, means for rigidly connecting said upper and lower sections comprising, means for causing movement of said upper extent of said lower section, when engaged in said recess, relatively toward said upper section with said lip overlapping said upper extent on said interior side of said lower section, and cooperating wedging means attached to said exterior side of said upper and lower sections responsive to said movement to bias said lip toward said upper extent.

2. Shower enclosure as claimed in claim 1 wherein said junction extends horizontally across the side and rear walls of said enclosure.

3. Shower enclosure as claimed in claim 2 including a bath wherein said junction is above said bath level.

4. Shower enclosure as claimed in claim 2 where said upper section lip is displaced inwardly by an amount approximately equal to the thickness of said lower section.

5. Shower enclosure as claimed in claim 4 including a bath wherein said junction is above said bath level.

6. Shower enclosure as claimed in claim 1 where said upper section lip is displaced inwardly an amount approximately equal to the thickness of said lower section.

7. Shower enclosure as claimed in claim 6 including a bath wherein said junction is above said bath level.

8. Shower enclosure as claimed in claim 1 including a bath wherein said junction is above said bath level.

* * * * *